Aug. 7, 1956  O. WELTER  2,758,231
ELECTRICAL COMMUTATOR MACHINE
Filed July 23, 1951  3 Sheets-Sheet 1

Inventor
Otto Welter
by Karl Michaelis, Atty.

Aug. 7, 1956             O. WELTER             2,758,231
ELECTRICAL COMMUTATOR MACHINE

Filed July 23, 1951                                        3 Sheets-Sheet 3

Inventor
Otto Welter
by Karlikiekaity, Atty.

United States Patent Office 2,758,231
Patented Aug. 7, 1956

2,758,231

ELECTRICAL COMMUTATOR MACHINE

Otto Welter, Orselina, Switzerland, assignor to Elektro-Motoren Aktiengesellschaft, Zug, Switzerland, a joint-stock company under Swiss law Application July 23, 1951, Serial No. 238,110

Claims priority, application Switzerland July 28, 1950

2 Claims. (Cl. 310—268)

This invention relates to electrical commutator motors and dynamos formed with axial air gaps. It has particular reference to low output motors and dynamos of this type, although the invention may be applied also to large units.

On principle an axial design of electrical machines is well known, however, apart from the axial arrangement of the slots and the different form of the stator and rotor coils required in such slots no change has hitherto been suggested as compared to radially designed machines. More especially the slots of the rotors were designed in half-closed form as was up to then the usual way of proceeding in all smaller axial machinery.

This involved the drawback that the rotors had to be wound by hand. Apart from this, because the machines with an axial air gap as hitherto known were used only for special purposes, it never appeared worth while to provide rotor winding machinery specially adapted for this type of electrical machines and in consequence thereof the number of axial air gap machines remained much lower than that of machines formed with a radial air gap merely because the cost of manufacture was much higher.

It is an object of this invention to provide motors and dynamos with axial air gap so designed as to enable the winding of their parts to be effected in an easier and more economical manner, thereby enabling axial air gap motors and dynamos to be used, as substitutes for radial air gap machines, whenever this should appear desirable.

The commutator machines with axial air gap according to this invention have all in common the feature that their stators and their rotors are formed with radially extending prismatic slots of rectangular cross-section and are made of magnetizable sintered iron powder.

With the stators and rotors so formed, the use of sintered iron offers particular advantages inasmuch as the manufacture of slotted stators and rotors with radial air gap encounters considerable difficulties. The sintering mold for the production of a stator must include a core with undercut outwardly directed teeth which render production of the stator precarious and difficult and molds of this kind command a high price.

The present invention offers the means for overcoming these difficulties by permitting the iron parts of the motor to be made from sintered material in a particularly simple and effective way. According to the invention the stator and the rotor are discs set with prismatic teeth on one of their surfaces. The molds required for their manufacture thus do not comprise a core and are not undercut. Consequently there is no risk connected with the stripping of the sintered parts from their mold. Obviously, owing to their peculiar form they can be manufactured much more easily than any sleeve-shaped parts with an intricate assembly of inwardly directed teeth such as are required by the usual forms of stators.

Apart from these advantages of production, the parts so formed also offer the possibility of forming the coils by winding with the aid of templets, to embed them in a former with the aid of artificial resin and to place them in the slots after the resin has solidified. This advantage is of particular value also for the manufacture of the rotor. It is clear that only in connection with machines with an axial air gap the possibility exists of producing the entire windings previous of their insertion and, by embedding them in resin, to render them so stiff that they keep their form, because the winding itself does not require any change of form when placing it in the slots. Even the rotor winding can be prepared as a whole outside of the machine and after having been embedded in the resinous mass, placed in the slots as a self-contained unit.

It is obvious that, as compared with the manual winding hitherto adopted with small motors or with the use of a highly complex winding machine, the new way of proceeding in accordance with the new invention involves huge advantages, also from an economic point of view. Even the time-consuming coating of the iron skeleton and more especially the motor is dispensed with because the coils embedded in artificial resin can be inserted directly in the empty slots.

This possibility largely depends from the mechanical properties of the iron parts and more especially the slots. While iron parts composed of stamped sheet metal or parts formed with slots by milling display sharp edges and rugged surfaces, nothing of the kind is present in sintered parts and their absence allows the machine to be wound in a simple and economical manner.

Thus the production of machines of the kind here described requires only a minimum of time and work. The form of the parts and the sintered material employed in their construction combine to yield a machine of high quality at low cost.

In the drawings affixed to this specification and forming part thereof some embodiments of this invention are illustrated diagrammatically by way of example.

In the drawings:

Fig. 1 is an axial section of a commutator machine according to this invention,

Fig. 2 being an elevation showing the stator of this machine as viewed from the rotor side, the stator winding being shown schematically.

Figure 1:
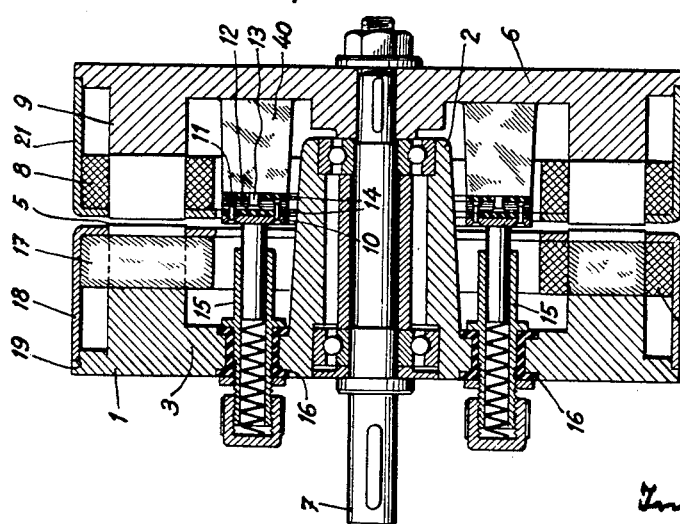

The machine illustrated in Fig. 1 comprises a stator 1 made from sintered soft-iron powder compacted under pressure and consisting of a disc-shaped part 3, a hub 2 for the rotor bearing and teeth-shaped poles 4 separated from each other by prismatic slots 5 of rectangular cross-section. The rotor is formed and compounded in an analogous manner. On the disc 6, keyed on the shaft 7, are mounted the poles 9 which are also separated from each other by prismatic slots of rectangular cross-section. The number of slots of the rotor need not be the same in the rotor and the stator, but in the machine shown in the drawing the two sintered bodies have the same number of slots.

The commutator or collector is arranged as a rule radially as shown in the drawing, but may also be arranged axially wherever this should be more advantageous. It consists of copper segments 10 which are fixed by means of rivets 11 on a disc 12 made of insulating material and fixed by means of rivets 13 to the fan blades 40 of the rotor. An insulating disc 14 insulates the collector relative to the rotor.

Opposite the collector brush holders 15 are arranged in the stator casing 1, being insulated relative to the casing by means of an insulating sleeve 16.

Figure 2:
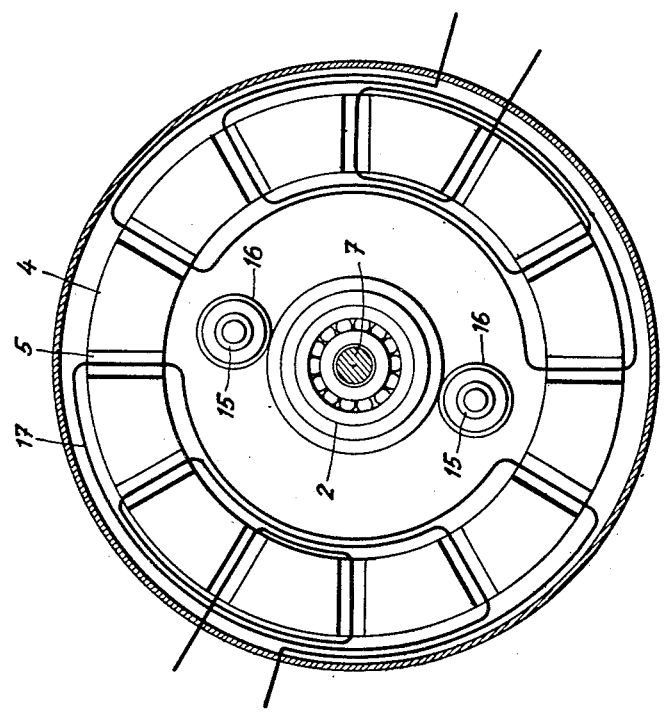
Figure 6:
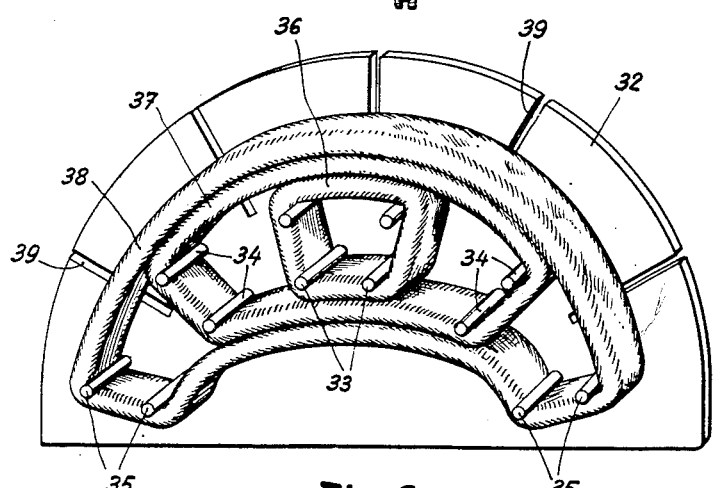
Fig. 6 illustrates a templet adapted for the winding of a stator coil, one such coil being shown in place on the templet.

The stator winding 17 shown schematically in Fig. 2 is wound according to another feature of this invention on a templet which consists of a board 32 (Fig. 6) with perforations suitably arranged therein for the reception of pins 33, 34, 35 inserted in these perforations. In producing a stator winding 17, the pins 33 are first inserted in the board 32 and the coil 36 is wound around these pins. When this coil has been formed with the sufficient number of windings, pins 34 are inserted and the coil 37 is then wound from the same wire. The coil 38 is then wound around the pins 35.

Slots 39 are further provided in the board which serve for inserting therein twine for binding the finished winding together. If the stator is formed with a greater number of slots than here shown, a correspondingly greater number of perforations is provided on the board 32. If it is not desired to wind all the slots of the stator as will mostly be the case with single phase machines, one may for instance start with the winding of the coil 37, while dispensing with the coil 36.

The coils wound in this manner may be impregnated with, or embedded in, artificial resin within the slots corresponding to the stator teeth of a gauge and can then simply be inserted in the non-insulated stator slots 5 without requiring any further treatment.

The winding produced in this manner is covered and kept in position by means of a hood 18 of artificial resin which is mounted on the shoulder 19 of the stator casing. This hood 18 (Fig. 1) is formed at its front side with apertures 22 through which project the stator poles.

In a similar manner the rotor winding 20 is built up from individual coils, as a rule identical, which are prepared on the winding device. The rotor winding corresponds as to its schematical design, to one of the well-known kinds of continuous current windings. When winding the rotor, there are first inserted in a well-known manner in the slots all lower sides of the coils. Thereafter the top sides of the coils are placed thereon and the heads of the windings are forced down onto the sheet metal pack to form a plait winding. In analogy to the stator also the rotor slots are covered and enclosed by a hood 26 formed of artificial resin and this hood at the same time prevents the outer winding heads of the rotor coil from being thrown out by centrifugal force. In the case of larger units the hood 21 may simply be replaced by a bandage of a well-known kind which is able to take up to highest strain. The slots 5 of the stator and of the rotor are of quadrangular cross-section and this feature renders their production more economical.

The physical efficacy of a machine of this type is quite analogous to that of well-known machines of the same general type and therefore it is also possible to produce in the same manner all kinds of multiple winding machines such as transformers or compound machines. Polyphase commutator machines of this design can of course be produced also.

A motor of the type above described can for instance be particularly useful in cases where very short starting periods are required. In this case the rotor may be supported for axial displacement between two checks, the axial magnetic pull serving for pulling it into one position for rotation. At the moment when the machine is stopped, the rotor is forced away from the stator and into contact with a brake lining by means of a spring (not shown) so as to be braked instantly.

Figure 4:
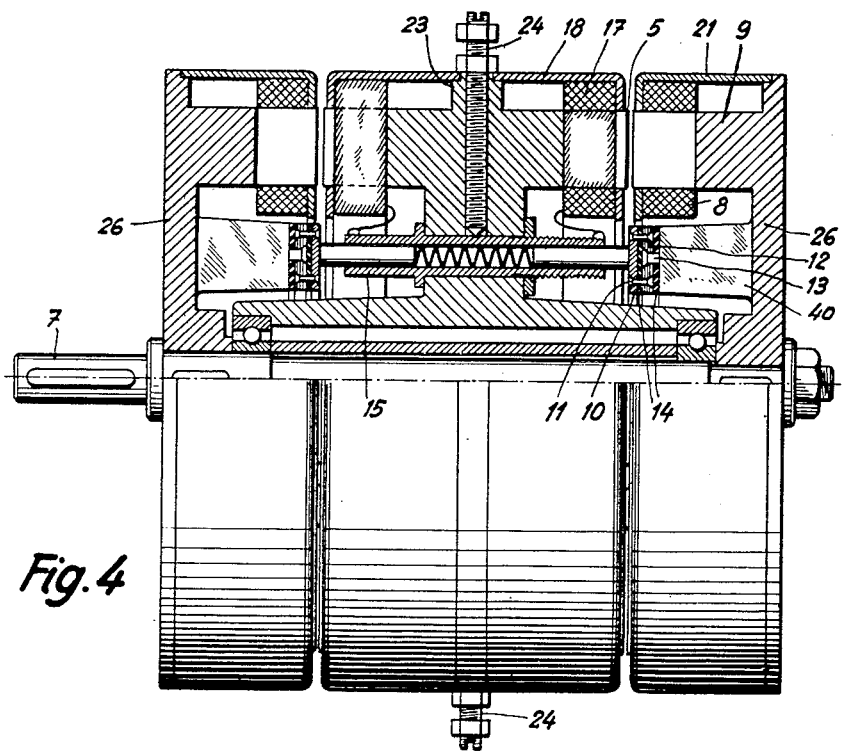
Fig. 4 is an elevation, partly in section, of a machine provided with two rotors and one stator.

The design according to this invention further renders possible a greater number of combinations in the mechanical building up of the machines. Thus for instance Fig. 4 represents a machine comprising two rotors. The stator 23 with terminals 24 is designed symmetrically to a plane normal to the axis and in analogy to the stator shown in Fig. 1. Two brush holders 25 carrying two brushes separated by a spring are provided. On each side of the stator 23 a rotor 26, identical to the one shown in Fig. 1, is arranged. In accordance with the voltage, current and output required in each case, the windings of the two machines may be connected in parallel or in series.

Figure 5:
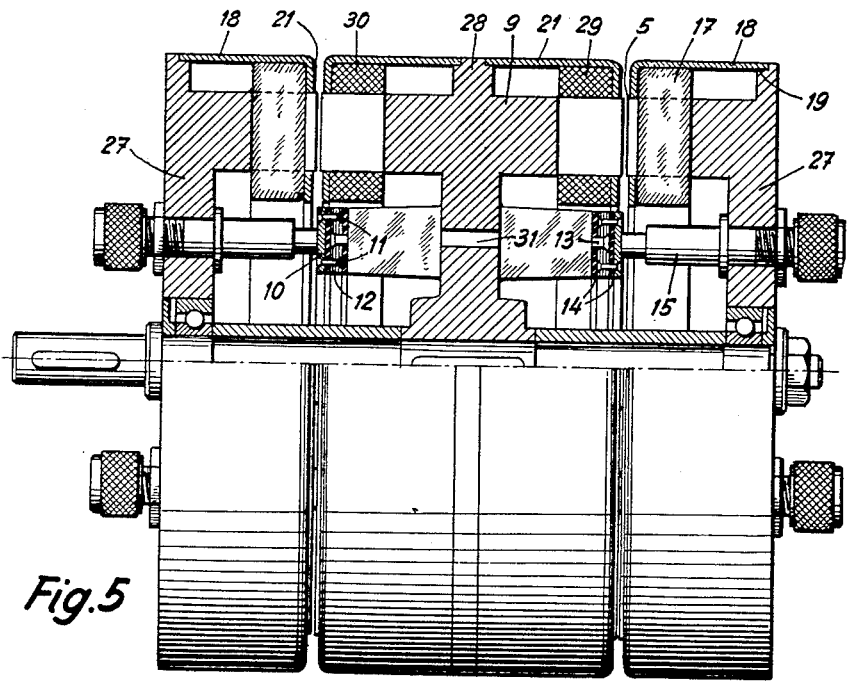
Fig. 5 is a similar view of a machine provided with two stators and one rotor.
Figure 3:
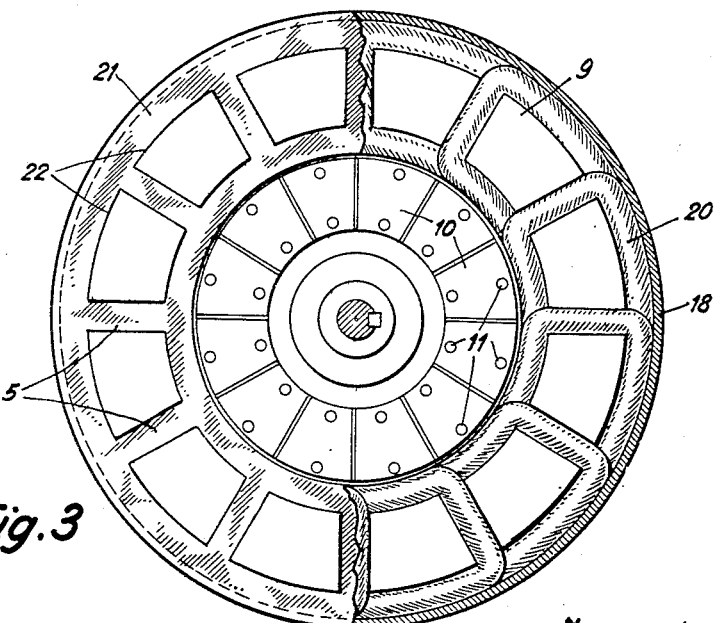
Fig. 3 is an elevation, of the rotor of this machine as viewed from the stator side.

Fig. 5 illustrates a machine having a symmetrically designed rotor 28 flanked by two stators 27. Here two pairs of brushes are provided for separately feeding the two motor windings 29 and 30. Instead of this only one pair of brushes and a collector may be provided and in this case the windings of the rotor which are not located on the collector side, are connected with the collector across openings 31.

The machines comprising two rotors or two stators involve the great advantage that the magnetic flux passes through the middle section only in purely axial direction and therefore this section need not be magnetically conductive at all in circumferential direction, so that the height of the annulus need not substantially exceed more than double the depth of the slots.

The magnetic field is only required to be closed in the exterior parts in the circumferential direction to the other pole. The height of a machine with two rotors or two stators does not therefore increase in correspondence with the duplication of the machine output and therefore these machines possess a very light weight relative to their output.

Thus this invention provides means and ways for making quite especially the winding of small size machines considerably more rational, quite especially in economical respect, while enabling this type of machines to produce a higher specific output.

Various changes may be made in the design and assembly of the new type of machines as described hereabove and shown in the drawings without departing from the invention or sacrificing the advantages thereof.

I claim:

1. A rotating electrical machine of the axial air gap type comprising a stator member and a rotor member, each of said members having radially extending slots of rectangular cross section forming field poles between them, electrical coils on said poles in said slots, said members being formed with interior annular chambers between said coil carrying poles and the centers of said members, fan blades secured to said rotor member in the annular chamber thereof, a commutator with segments connected to the coils of said rotor member and secured to said fan blades in said annular chamber, said segments having lateral contact surfaces, and brushes attached to said stator member in the annular chamber thereof to engage said lateral segment contact surfaces in a plane perpendicular to the axis of said rotor member.

2. A rotating electrical machine according to claim 1, a hood of non-magnetic material on each of said members covering its electrical coils and its poles at their outside and having apertures through which the free ends of said poles project.

References Cited in the file of this patent

UNITED STATES PATENTS

| | | |
|---|---|---|
| 280,039 | Hopkinson et al. | June 26, 1883 |
| 290,350 | Paine | Dec. 18, 1883 |
| 382,174 | Mackie | May 1, 1888 |
| 1,605,796 | Tanzler | Nov. 2, 1926 |
| 1,737,128 | Ross | Nov. 26, 1929 |
| 1,946,957 | Allen | Feb. 13, 1934 |
| 2,101,665 | Arey et al. | Dec. 7, 1937 |
| 2,221,983 | Mayer et al. | Nov. 19, 1940 |

(Other references on following page)

UNITED STATES PATENTS

| | | | |
|---|---|---|---|
| 2,247,890 | Reardon | July 1, | 1941 |
| 2,356,972 | Chubbuck | Aug. 29, | 1944 |
| 2,386,604 | Goetzel | Oct. 9, | 1945 |
| 2,433,390 | Packer | Dec. 30, | 1947 |
| 2,479,589 | Parker | Aug. 23, | 1949 |
| 2,683,232 | Weissheimer | July 6, | 1954 |
| 2,691,124 | Aske | Oct. 5, | 1954 |

FOREIGN PATENTS

| | | | |
|---|---|---|---|
| 493,281 | Germany | Mar. 3, | 1930 |
| 883,170 | Germany | July 16, | 1953 |